US006645289B2

(12) United States Patent
Sobolev et al.

(10) Patent No.: US 6,645,289 B2
(45) Date of Patent: *Nov. 11, 2003

(54) COMPLEX ADMIXTURE AND METHOD OF CEMENT BASED MATERIALS PRODUCTION

(75) Inventors: Konstantin Sobolev, KKTC (TR); Svetlana Soboleva, Ankara (TR)

(73) Assignee: Sci Con Technologies, Inc., Providenciales (TC)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/424,564

(22) PCT Filed: May 26, 1998

(86) PCT No.: PCT/TR98/00008

§ 371 (c)(1),
(2), (4) Date: May 16, 2000

(87) PCT Pub. No.: WO98/54108

PCT Pub. Date: Dec. 3, 1998

(65) Prior Publication Data

US 2003/0188669 A1 Oct. 9, 2003

(30) Foreign Application Priority Data

May 26, 1997 (TR) .............................................. 97/426

(51) Int. Cl.[7] .............................................. C04B 14/04
(52) U.S. Cl. ...................... 106/705; 106/713; 106/714; 106/715; 106/718; 106/719; 106/724; 106/726; 106/735; 106/820; 106/823
(58) Field of Search ................................ 106/705, 713, 106/714, 715, 718, 719, 724, 726, 735, 737, 820, 823, DIG. 1, DIG. 2

(56) References Cited

U.S. PATENT DOCUMENTS

| | | | |
|---|---|---|---|
| 4,297,309 A | | 10/1981 | North |
| 4,441,929 A | | 4/1984 | Marcellis et al. |
| 4,460,720 A | | 7/1984 | Gaidis et al. |
| 4,704,415 A | | 11/1987 | Pierce et al. |
| 4,829,107 A | * | 5/1989 | Kindt et al. .................... 524/3 |
| 4,931,098 A | * | 6/1990 | Danielssen et al. ......... 106/638 |
| 5,192,366 A | * | 3/1993 | Nishioka et al. ............. 106/724 |
| 5,227,351 A | | 7/1993 | Gasper-Galvin et al. |
| 5,275,652 A | * | 1/1994 | Dastol ......................... 106/482 |
| 5,302,200 A | * | 4/1994 | Smetana et al. ............. 106/482 |
| 5,405,535 A | | 4/1995 | Yamamoto |
| 5,466,289 A | | 11/1995 | Yonezawa et al. |
| 5,472,501 A | * | 12/1995 | Dastol ......................... 106/823 |
| 5,494,516 A | | 2/1996 | Drs et al. |
| 5,584,920 A | | 12/1996 | Sawatzky et al. |
| 5,588,990 A | * | 12/1996 | Dongell ....................... 106/716 |
| 5,601,643 A | | 2/1997 | Silverstrim et al. |
| 5,685,903 A | | 11/1997 | Stav et al. |
| 5,735,947 A | | 4/1998 | Hopkins et al. |
| 5,843,216 A | * | 12/1998 | Dastol ......................... 106/819 |
| 5,853,475 A | | 12/1998 | Liskowitz et al. |
| 5,976,240 A | * | 11/1999 | Vezza ........................... 106/694 |
| 6,086,669 A | * | 7/2000 | Patkar et al. ................ 106/491 |
| 6,379,456 B1 | * | 4/2002 | Heathman et al. .......... 106/724 |

FOREIGN PATENT DOCUMENTS

| | | | |
|---|---|---|---|
| EP | 0431600 B1 | * | 7/1994 |
| JP | 61209939 | * | 9/1986 |
| JP | 63225564 | * | 9/1988 |
| JP | 06024814 | * | 2/1994 |
| JP | 06256053 | * | 9/1994 |

OTHER PUBLICATIONS

"A Study of the Combined Infhoue of Condensed Silicon Fume & Water Reducing Additives" Markestud Mater Street 1986(19), 109 p39–47.*
"Microsilia Based Admixtures for Concrete" Svenkered et al. Admixtures Concrete Proc. Int Symp. (1990) p 346–59.*
"Slump Retention of Fly Ash Lomote with or without Chemical Admixtures" RAVINA Concr. Int'l (1995), 17(4) 25–9.*
K. Sobolev and S. Soboleva, 92+ Grade High Performance Cement: Solution for Next Millennium, (unpublished) (No Date Available).
Ronin, Vladimir; Jonasson, Jan–Erik and Hedlund, Hans. "Advance Modification Technologies of the Portland Cement Based Binders for Different High Performance Applications", 10th International Congres on the Chemistry of Cement, Jun. 2–6, 1997 (proceedings).
Wang, Jun–Feng. "High Performance Cementous Binder", 10th International Congress on the Chemistry of Cement, Jun. 2–6, 1997 (procceedings).
Sivkov, Serge P.; Mundshtukov, Dmitry V.; Jedda, Imed. "Organo–Mineral Fillers for Cements" 10th International Congres on the Chemistry of Cement, Jun. 2–6, 1997 (proceedings).
Ioudovitch, B.E. et al. "Low–Water Requirement Binders as New–Generation Cements", 10th International Congres on the Chemistry of Cement, Jun. 2–6, 1997 (proceedings).
Sobolev, K.G. "High Performance Cement for High Strength and Extreme Durability".
Sobolev K.G. and Soboleva S.V. "High Performance Indigenous Cement". XXIVth World Housing Congress, Ankara, 1996, pp. 189–202.
Sobolev K.G. and Soboleva S.V. "High Performance Cement: From Idea to Industrial Trials". 7th International Conference of Management of Technology, Orlando, USA, 1998.
Sobolev K.G. and Soboleva S.V. "Environmental Aspects of High Performance Cement Production", 1st International Symposium on Cement Industry, Assiut, Egypt, 1997.

* cited by examiner

Primary Examiner—Paul Marcantoni
(74) Attorney, Agent, or Firm—Blank Rome LLP

(57) ABSTRACT

The present invention relates to admixtures production and to a method of application of the admixtures in cement and concrete technology. The method allows production of high-strength and high durable cement based systems, as well as cement systems with specially designed properties of cheap high-volume mineral admixture cements.

78 Claims, No Drawings

COMPLEX ADMIXTURE AND METHOD OF CEMENT BASED MATERIALS PRODUCTION

This application is the National Phase Filing of PCT International Application No. PCT/TR98/00008, filed May 26, 1997, published Dec. 3, 1998, as Publication No. WO 98/54108, the full disclosures of which are incorporated by reference herein.

BACKGROUND OF INVENTION

1. Field of the Invention

The present invention relates to admixtures production and to method of the admixtures application in cement and concrete technology. The method allows to produce high-strength and high durable cement based systems, as well as cement systems with specially designed properties or cheap high-volume mineral admixture cements.

2. Description of the Prior Art

The admixtures for cement systems, especially high range water reducers or superplasticizers, have significant influence on strength and durability of concrete due to ability to reduce water demand and provide low porosity and permeability. The usage of such admixtures allows to produce concrete with high level of properties. The application of new high range water reducing agents for production of ultra high-strength concrete is explained in some U.S. patents (U.S. Pat. No. 5,466,289). Advantages of the high strength and high durable concrete have provided their large-scale applications in construction projects such as high-rise buildings, bridges, marine and offshore structures, tunnels, parking desks, repairing of structures, etc.

There are many products marketed as high range water reducers for concrete. The original composition of high range water reducers is protected by numbers of International patents (for instance, in U.S. Pat. No. 5,584,920; 5,494,516; 4,704,415; 4,460,720 and 4,441,929) and it is well-known that essentially they are lignosulphonates-, melamine-, naphthalene- and polyacrylate-based compounds. The process of water reduces production is realised in aqueous solution and the final product contains 55–75% of water. Application of water reducers in aqueous solution is impossible for some dry production process, such as cement and dry mortar. Usage of dry or semi-dry water reducers is more attractive for ready mix and precast concrete plant or construction site due to the reason of easy transportation and storage. For such projects dry powder water reducers are available. Production cost of the powder admixtures rises up to two times because drying process in special apparatus is used to remove water. Development of the cheapest process for the dry- or semi-dry water reducing admixtures would be useful to extend the frames of their application.

Process explained in U.S. Pat. No. 4,297,309 (except final procedure of firing) that allow to produce articles with different shape based on fine silica particles and water is very close to present invention. Application of active calcium reactive sorbents for combining of some gas and liquid chemicals, especially for sulfur dioxide and metals, is also described in some U.S. patents (U.S. Pat. No. 5,405,535; 5,227,351). Usage of invented complex admixture in cement and concrete technology is similar to existing mode for mineral admixtures such as fly ash (U.S. Pat. No. 5,601,643) application.

The main difference of the present invention is ability to create economical combinations in sorbent—water reducer system that can be used as universal and super effective modifiers for cement systems. The available test results confirm that synergetic effect of sorbent—water reducer is multiplied in case of increasing of preliminary treatment of cement—invented modifier compositions in dry or liquid state. This advantages allow to achieve new level of properties or provide production of wide range of new and more economic cement based materials with conventional properties.

SUMMARY OF THE INVENTION

The present invention is directed to development of the dry and semi-dry admixtures composition and production process. The usage of active silicon dioxide based sorbents allows to combine water containing in water reducers and to produce new complex admixture for modifying of cement system. The main criterion of sorbents selection is compatibility with cement system, especially for long-term action. The correct combinations in sorbent—water reducer system allows to create wide range of universal and super effective modifiers for cement systems.

The method of the complex admixture application in cement and concrete technology allows to produce the high-strength and high durable cement based systems, as well as the cement systems with specially designed properties or cheap high-volume mineral admixtures cements. The method is based on modification of cement or dry mix in production process by invented complex admixtures. This allows to increase the compressive strength of cement based materials up to 145–180 MPa and/or to introduce a large quantity of mineral indigenous admixtures up to 70% in the cement composition.

DETAILED DESCRIPTION OF THE INVENTION

The dry or semi-dry complex admixtures production process includes mixing of water reducer solution with powder components of active sorbents.

The most important component of the sorbent is presented by fine alkali reactive silicon dioxide based materials. Virtually any composition that includes fine or superfine non-crystalline silicon dioxide may be applied in the practice. Such compositions include, but are not limited by fly ash, rice husk ash, zeolite, silica fume, bentonite, activated kaolin, montmorillonite, diatomaceous earth, etc. The mass ratios of reactive silicon dioxide component to water reducer ranging from about 5:1 to about 100:1 are preferred.

Available high range water reducers, as well as their mix (including other admixtures) can be used. The best results are achieved in case of sulphonated melamine (SMF) or naphthalene (SNF) formaldehyde, as well as polyacrylate (PA) based high range water reducer application. The water content of high range water reducer component can be varied from about 25 to about 85%.

The high porous lightweight sand (with particles size less than 5 mm) can be used as water accumulating component of active sorbent. The wide range of natural and artificial lightweight materials, as volcanic pumice, tuff, expanded clay, expanded perlite, expanded slag, expanded glass, etc can be used. The mass ratios of reactive silica to accumulating porous component can be varied from about 10:1 to about 1:1.

The non-organic or organic salts or hydroxides of metals can be used as electrolytic agent, which provide better distribution and dissolving of the complex admixture particles in aqueous media. Such compositions include, but are not limited by metal (especially, alkali and alkali earth) aluminates, hydroxides and carbonates: sodium nitrite, sulphate Al, Na, K, Ca, calcium chloride, calcium formate, etc. The introduction of the electrolytic agent into process can be made before or together with reactive silica component mixing in order to provide better homogenisation of system. The mass ratios of reactive silica component to electrolytic agent can be varied from about 10:1 to about 1000:1. Accelerating effect on cement hardening process can be achieved in case of the composition application.

The hydrated, partially hydrated and dehydrated salts or combinations that are able to combine with water can be used to bond free water in the system. The water-combining component can be applied before, during or after mixing of the main composition. The last case provides the formation of the granules covered by dense protective layer. This solution may be very useful if total amount of water is high and due to some reasons reactive silica content can not be increased. The one or more types of calcium sulfate, high alumina cement or sulphate Na can be used as water combining component. The mass ratios of reactive silica to water combining component can be adjusted from about 1:1 to about 100:1. The effect of regulation of cement setting time, as well as accelerating of hardening process can be achieved for such composition.

The complex admixture can contain water-soluble polymer, which can be applied at any time during the main composition mixing. The usage of dry or aqueous dispersion of polymer, as well as combination of several polymers is possible. The introduction of the water-soluble polymer after mixing of the main composition provides the formation of the stronger granules. Acrylic acid or acrylic acid copolymers, polyvinyl alcohol, polyvinyl acetate, poly acryl amide, polyethylene oxide, cellulose ethers, methyl cellulose, carboxymethyl cellulose, hydroxyethyl cellulose can be applied in this composition. The mass ratio of reactive silica to water soluble polymer can be varied from about 3:1 to about 100:1. The usage of the complex admixtures containing water soluble polymer for cement modification allows to produce the systems with desired rheological behaviour, for instance, reduce the cement paste viscosity at the certain time, increase pumping of fresh mortar and concrete, as well as to improve some strength characteristics, as tensile, flexural, impact and bond strength, modulus of elasticity, etc.

The composition can contain any retarders of hydration, setting, and hardening of cement system. The retarders include, but are not limited by lignosulphonates, sugars, hydroxycarbonic acids and their salts, carboxylates, phosphonic or phosphoric acids, as well as their ethers and salts. The mass ratio of reactive silica to retarder can be chosen from about 50:1 to about 1000:1. The retarder application is more suitable for delaying of cement setting time, as well as for significant reduction of heat development.

The available air detraining, hydrophobic, air entraining, foaming and/or gas creating admixtures can be applied as component of the main composition. Three-butyl phosphate can be used as air detraining component. Silicon based compounds containing silicones, silanes, silanols or siloxanes groups such as alkyl alkoxy silanes can be used as hydrophobic components. Air entraining and foaming agents can be neutralised hydroaromatic and fatty carboxylic acid, tall oil, vinsol resin and protein-based admixtures. The powder of some metals (for example, aluminium), as well as hydrogen peroxide can be applied as gas creating admixture. The film and structure creating actions, as well as self-dissolving effects of these admixtures are used for production of well-performed complex products. The mass ratio of reactive silica to structure formation components can be varied from about 10:1 to about 10000:1. The usage of this kind of structure formation components provides necessary porous system of cement paste from dense non-porous to cellular lightweight structure. The hydrophobic components provide creation of super thin hydrophobic layer on porous area surface. The gas creating agents can be used also for elimination of shrinkage, production of expanding cements or accelerating of hardening and heat development for production self-curing systems.

Grinding aids can be submitted as component of the main composition. The triethanol amine, amine acetate salts, EDTA, acetic acid, hydrocarbons, silanes, methyl chloride or fluorine silanes, etc can be used as grinding aid components. The effect of grinding acceleration is achieved due to reducing of agglomeration and surface tension. The mass ratio of reactive silica to grinding aid components can be varied from about 10:1 to about 10000:1.

The main idea of the mix proportioning is to create workable, dry or semi-dry complex admixture that meets the cost/benefit requirements and has significant improving influence on cement system properties. The presented mix design also provides protection against undesirable reaction between the complex admixture components, mainly, due to high content of water reducer and small amount of water available for such reaction.

Any mixing process can be applied in the practice to meet the main requirement of composition homogenising. The promising results are demonstrated by the high speed mixers (spindle or planetary type), vibrating mixers or mills, as well as the air jet mixers or mills. In case, if necessary, any types of the granulating equipment can be used for finishing of the complex admixture. The product as per the invention might be presented by wide range of coarse and fine granules. The quality the complex admixture can be improved by drying, pressing, extrusion, crushing, calendering, etc. The required physical characteristics, as well as better homogenising of composition, necessary fineness and shape are achieved by means of such treatment.

The introduction of the complex admixture into cement or dry mix production process allows to increase the compressive strength of these materials up to 145–180 MPa. The cement composition can contain portland cement clinker including one or more combination of calcium silicates and/or calcium aluminates and one or more types of calcium sulfate, or portland cement with Blaine specific surface area less than 400 m/kg and the complex admixture. The mass ratio of portland cement to complex admixture can be varied from about 100:1 to about 2:1. The chemical composition of clinker and cement can vary in the limits of existing standards or special clinker and cement can be used. Generally, any kind of existing cements can be applied in this composition. (for example, in accordance with ASTM C150, C595, C845, C91 or prEN197-1) This cements include, but are not limited by general use cements, moderate heat of hardening cements, high early strength cements, low heat cements, sulfate resisting cements, white portland cements, blended hydraulic cements, portland blast furnace slag cements, portland-pozzolan cements, special cements, expanding cements, high alumina cements, oil-well cements, etc, as well as any combination and mix of this cements.

The large quantity up to 70% of mineral indigenous admixtures can be introduced in the cement composition. The natural materials as pozzolans, volcanic glasses, diatomaceous earth, perlite, tuff volcanic pumice, natural sand, quarts, marble, limestone, burnt gaize, burnt clay, burnt shale, rice husk ash, bentonite, activated kaolin, etc and industrial by-products or wastes as granulated blast furnace slag, fly ash, silica fume, catalytic and alum wastes, broken glass and ceramic, calcium sulfate, etc can be used as mineral admixtures. Selection of special mineral admixtures, for instance with high density, chemical, thermal or abrasion resistance, thermal expansion, electric conductivity etc allow to produce cement systems with specially designing and unique properties. The mass ratio of mineral indigenous admixtures to complex admixture can be varied from about 100:1 to about 1:1. Maximum quantity of mineral admixtures in the cement composition depends on type of mineral admixtures, as well as strength and durability level required.

The dry mix can contain specially selected dry aggregates (for example, in accordance with ASTM C387 or C33). The mass ratio of aggregates to total cementing material (cement, mineral admixtures and complex admixture) can be varied from about 10:1 to about 1:2.

The existing apparatus and technologies can be used for cement or dry mix production process. Satisfactory results were achieved by the application of high speed mixers (for dry mix or blended cement production), vibrating mixers or mills, air jet mixers or mills, ball mills, tube ball mills (for cement production). The mode of complex admixture introduction into portland cement—mineral admixtures—aggregates systems covers all possible combinations. Adequately formula was concluded in case if portland cement clinker and calcium sulfate (or portland cement as component) and the complex admixture was interground in mill (preferable, open cycle ball mill). The product in accordance with the formula is presented by modified super high strength cement, which can be used as final product or for consequent production of the blended cements (by inter grinding or mixing with mineral admixtures) and dry mix (by mixing with aggregates). Joint interground clinker (or portland cement)—mineral admixture—complex admixture system also possessed high level of properties. Separate grinding of clinker and mineral admixture components and consequent intergrinding or mixing with complex admixture allows to design systems with very small water demand due to optimal and dense particles packing.

The concrete and mortars based on modified cements posses high strength and high durability, as well as excellent workability and pumping. The wide range of aggregates and fibrous materials (as polypropylene, nylon, glass) can be used for concrete and mortars production. Introduction of the complex admixture as component of concrete mix is also possible, and for this case usage of pre-mixer is recommended. Good mixing effect is achieved if complex admixture, water and part of cement were pre-mixed in colloid mixer. Selection of special fillers and/or aggregates for concrete, for instance with high density, chemical, thermal or abrasion resistance, thermal expansion, electric conductivity etc allow to design the wide range of concrete with special and unique properties.

The complex admixture modified cement paste, mortar or concrete based materials can be used after any kind of consequent treatment in fresh or hardening state. These treatment processes include, but are not limited by vibrating, pressing, extrusion, calendering, drying, heat or autoclave treatment, etc. The required properties of products can be achieved by means of such treatment.

The invention can be described by the following examples which can explain the advantages of complex admixture application in cement and concrete technology and demonstrate the opportunity of production of the cement based systems with unique properties. The examples are not intended to limit the scope of the invention. In what follows, "%" will mean "weight %", "ratio" will mean "weight ratio" and "parts" will mean "weight parts".

EXAMPLE 1

The example demonstrates the ability to raise the strength properties of normal portland cement based systems in case of complex admixture application for modifying of cement grinding process.

The complex admixture mix proportioning was the following:

TABLE 1

| Type | Name | Specification | Composition |
|---|---|---|---|
| High Range Water Reducer | Sikament FF | 35% Solid Content | 3 |
| Water Soluble Polymer | Mowilith-LDM2072 | | 1 |
| Low-Calcium Fly Ash | — | 40% $SiO_2$ Content | 10 |
| Condensed Silica Fume | — | 90% $SiO_2$ Content | 10 |

The mixing of components in planetary mixer was continued during 5 minutes and after this procedure the complex admixture was presented by semi dry grainy particles with 0.5–4 mm diameter. The produced admixture was used as modifier of cement grinding process. The composition was based on portland cement clinker, admixture and gypsum. The admixture amount was varied from 0 to 40% and the gypsum content was constant as 4% of clinker weight. The grinding media to total materials ratio was kept as 10:1 and grinding time was 1½ of hour. The properties of modified cements and dry mixes (at sand to cement ratio 1:1) in accordance with ASTM C348/C349/C387 are presented in Table 6. The test results indicate significant rise of the strength properties of modified cement systems at complex admixture content from 10 to 40%.

EXAMPLE 2

The example demonstrates the ability to apply the complex admixture for the increasing of the early strength of blended cements containing 60% of blast furnace slag or fly ash.

The complex admixture mix proportioning was the following:

TABLE 2

| Type | Name | Specification | Composition |
|---|---|---|---|
| SMF High Range Water Reducer | Melment-L10 | 35% Solid Content | 3 |
| Lightweight Perlite Sand | — | $D_{max}$ = 1 mm | 3 |
| Hemi Water Gypsum | — | — | 3 |
| Rice Husk Ash | — | 90% $SiO_2$ Content | 10 |

The mixing procedure was the same as per Example 1. The produced admixture was used as modifier of cement grinding process. The composition was based on 60% of blast furnace slag or fly ash, 35% portland cement and 5% of the admixture. The grinding equipment and conditions were the same as per Example 1 and grinding time was ½ of hour. The test results of modified cements and dry mixes (at sand to cement ratio 1:1) are presented in Table 6. The test results indicate significant rise of the early age strength of modified cement.

EXAMPLE 3

The example demonstrates the effect of the complex admixture to delay the setting of high strength cements.

The complex admixture mix proportioning was the following:

TABLE 3

| Type | Name | Specification | Composition |
|---|---|---|---|
| Hyperplasticizer | Sikament-NN | 40% Solid Content | 15 |
| Sulphate Na | — | — | 1 |
| Modified Lignosulphonate | Plastiment-BV40 | 30% Solid Content | 1 |
| Methyl Hydroxyethyl Cellulose | Tylose-MN | 100% Powder | 3 |
| Silica Fume | — | 90% $SiO_2$ Content | 50 |

The mixing procedure was the same as per Example 1. The produced admixture was used as modifier of cement grinding process. The composition was based on portland cement clinker and admixture. The admixture amount was varied from 5 to 10%. The grinding time was 1½ of hour. The test results of modified cements and dry mixes are presented in Table 6. The test results indicate significant delay of the high strength cement setting time.

EXAMPLE 4

The example demonstrates the ability to reduce the cement grinding time, as well as increase of the cement early strength.

The complex admixture mix proportioning was the following:

TABLE 4

| Type | Name | Specification | Composition |
|---|---|---|---|
| SNF High Range Water Reducer | Sikament-FF | 35% Solid Content | 15 |
| Calcium Formate | — | — | 1 |
| Triethanol Amine | — | 15% Solid Content | 1 |
| Low-Calcium Fly Ash | — | 40% $SiO_2$ Content | 50 |
| Zeolite | — | 50% $SiO_2$ Content | 50 |

The mixing procedure was the same as per Example 1. The produced admixture was used as modifier of cement grinding process. The cement composition and grinding conditions were the same as per Example 1. The admixture dosage was 5% and grinding time was 1 hour. The test results of modified cements and dry mixes are presented in Table 6. The test results indicate the reducing of the cement grinding time and increasing of the early age strength of modified cement.

EXAMPLE 5

The example demonstrates the possibility to design of the cement systems with special properties as super high strength, super low thermal expansion and high thermal resistance.

The complex admixture mix proportioning was the following:

TABLE 5

| Type | Name | Specification | Composition |
|---|---|---|---|
| SNF High Range Water Reducer | Sikament NN | 35% Solid Content | 5 |
| Zeolite | — | 40% $SiO_2$ Content | 10 |
| Condensed Silica Fume | — | 90% $SiO_2$ Content | 10 |

The mixing procedure was the same as per Example 1. The produced admixture was used as modifier of cement grinding process. The normal portland cement was replaced by 45% of fine pulverised (Blaine specific surface area of 350 $m^2$/kg) powder of Li—Si—Al—O—N glass brakeage that is a glass factory by-product as low thermal expansion filler and by 25% of the admixture (the portland cement content was 30% of total amount). The grinding equipment and conditions were the same as per Example 1 and grinding time was ½ of hour. The test results of dry mixes (at special sand to cement ratio 1:1) are presented in Table 6. The Li—Si—Al—O—N glass and ZnO—$Al_2O_3$—$SiO_2$ based ceramic brakeage are used as special sand in the dry mixes. The test results demonstrate the possibility to produce the cement systems with super high compressive strength up to 180 MPa and around 250 MPa after low temperature (150–450°C.) burning, super low thermal expansion coefficient up to $10^{6°}$ $C.^{-1}$ and high thermal resistance up to 750° C.

EXAMPLE 6

The example demonstrates the opportunity to produce wide range of the dry mix products based on high strength cement as per Example 1. The high strength cement containing 20% of the complex admixture was used. The test results of dry mixes at sand to cement ratio 1, 3, 5, 7, 10 are presented in Table 6. The test results confirm the ability to produce the super high strength dry mixes with compressive strength up to 145 MPa, high strength dry mixes (compressive strength 40–65 MPa) for wide scale applications, as well as very cheap normal grade dry mixes with sand content from 7 to 10 parts per 1 part of the high strength cement.

EXAMPLE 7

The example demonstrates the ability to produce super high strength concrete based on the complex admixture as per Example 1. The normal portland cement and the complex admixture at 40% content in total binder were used. The complex admixture and cement are pre-mixed with water in colloid mixer in order to produce activated fluid system. The admixture to cement ratio 1:1 and total amount of water have been used. The admixture-and-cement fluid pre-mix was used for concrete production immediately after activation. The mixture proportion and test results of concrete are presented in Table 7. The test results confirm the ability to produce the super high strength concrete with compressive strength up to 165 MPa.

TABLE 6

Complex Admixture Based Cement Proportion and Properties

| No | Clinker | Gypsum | Ad-mixture | Slag | Fly Ash | Specific Surface Area, m2/kg | Setting Time, h:min Initial | Setting Time, h:min Final | Cement Sand | W/C | Flexural Strength, MPa @ 1 day | 3 days | 7 days | 28 days | Compressive Strength, MPa @ 1 day | 3 days | 7 days | 28 days |
|---|---|---|---|---|---|---|---|---|---|---|---|---|---|---|---|---|---|---|
| 1.1.1 | 96 | 4 | 0 | 0 | 0 | 320 | 1:50 | 2:30 | 1:2.75 | 0.45 | 2.1 | 6.1 | 6.9 | 7.9 | 15.1 | 36.2 | 42.0 | 56.1 |
| 1.1.2 | 96 | 4 | 0 | 0 | 0 | 320 | 1:50 | 2:30 | 1:1.00 | 0.30 | 2.8 | 8.2 | 9.3 | 10.5 | 25.2 | 60.5 | 58.4 | 82.5 |
| 1.2.1 | 94 | 4 | 2 | 0 | 0 | 360 | 1:45 | 2:25 | 1:2.75 | 0.42 | 2.2 | 6.4 | 7.3 | 8.2 | 18.9 | 45.2 | 38.4 | 61.7 |
| 1.2.2 | 94 | 4 | 2 | 0 | 0 | 360 | 1:45 | 2:25 | 1:1.00 | 0.27 | 3.3 | 9.6 | 10.9 | 12.3 | 27.5 | 65.9 | 56.0 | 89.9 |
| 1.3.1 | 86 | 4 | 10 | 0 | 0 | 750 | 1:35 | 2:15 | 1:2.75 | 0.35 | 2.5 | 7.3 | 8.2 | 9.3 | 26.0 | 62.4 | 53.0 | 85.1 |
| 1.3.2 | 86 | 4 | 10 | 0 | 0 | 750 | 1:35 | 2:15 | 1:1.00 | 0.21 | 3.9 | 11.3 | 12.8 | 14.5 | 36.9 | 88.5 | 75.2 | 120.7 |
| 1.4.1 | 82 | 3 | 20 | 0 | 0 | 950 | 1:30 | 2:10 | 1:2.75 | 0.29 | 2.7 | 7.7 | 8.8 | 9.9 | 24.8 | 59.5 | 50.5 | 81.1 |
| 1.4.2 | 82 | 3 | 20 | 0 | 0 | 950 | 1:30 | 2:10 | 1:1.00 | 0.18 | 4.0 | 11.6 | 13.2 | 14.9 | 41.2 | 98.7 | 83.9 | 134.6 |
| 1.5.1 | 77 | 3 | 30 | 0 | 0 | 1150 | 1:25 | 2:05 | 1:2.75 | 0.25 | 2.8 | 8.1 | 9.2 | 10.4 | 27.2 | 65.2 | 55.4 | 88.9 |
| 1.5.2 | 67 | 3 | 30 | 0 | 0 | 1150 | 1:25 | 2:05 | 1:1.00 | 0.16 | 4.1 | 12.0 | 13.6 | 15.4 | 43.3 | 103.7 | 88.1 | 143.4 |
| 1.6.1 | 58 | 2 | 40 | 0 | 0 | 1350 | 1:20 | 2:00 | 1:2.75 | 0.22 | 4.4 | 7.7 | 10.3 | 11.9 | 28.5 | 62.6 | 74.1 | 94.4 |
| 1.6.2 | 58 | 2 | 40 | 0 | 0 | 1350 | 1:20 | 2:00 | 1:1.00 | 0.14 | 6.8 | 12.3 | 14.9 | 18.9 | 45.2 | 83.8 | 111.2 | 148.2 |
| 2.1.1 | 34 | 1 | 5 | 60 | 0 | 525 | 2:30 | 3:15 | 1:2.75 | 0.30 | 3.8 | 6.9 | 7.2 | 10.8 | 27.2 | 50.5 | 56.4 | 93.8 |
| 2.1.2 | 34 | 1 | 5 | 60 | 0 | 525 | 2:30 | 3:15 | 1:1.00 | 0.23 | 3.9 | 7.1 | 12.5 | 13.8 | 38.9 | 72.2 | 65.0 | 112.5 |
| 2.2.1 | 34 | 1 | 5 | 0 | 60 | 555 | 2:45 | 3:45 | 1:2.75 | 0.33 | 2.3 | 4.2 | 5.4 | 8.3 | 12.2 | 22.6 | 41.4 | 59.5 |
| 2.2.2 | 34 | 1 | 5 | 0 | 60 | 555 | 2:45 | 3:45 | 1:1.00 | 0.23 | 2.9 | 5.2 | 8.4 | 9.7 | 18.6 | 34.4 | 58.6 | 88.5 |
| 3.1.1 | 95 | 0 | 5 | 0 | 0 | 500 | 2:15 | 2:45 | 1:2.75 | 0.31 | 3.4 | 6.2 | 10.0 | 9.5 | 18.3 | 34.0 | 57.9 | 87.4 |
| 3.1.2 | 95 | 0 | 5 | 0 | 0 | 500 | 2:15 | 2:45 | 1:1.00 | 0.19 | 4.5 | 8.1 | 13.2 | 11.4 | 25.4 | 47.1 | 80.3 | 121.3 |
| 3.2.1 | 90 | 0 | 10 | 0 | 0 | 675 | 2:55 | 4:00 | 1:2.75 | 0.25 | 4.5 | 8.2 | 13.3 | 11.5 | 19.1 | 35.4 | 60.4 | 91.2 |
| 3.2.2 | 90 | 0 | 10 | 0 | 0 | 675 | 2:55 | 4:00 | 1:1.00 | 0.15 | 6.0 | 10.9 | 17.6 | 15.2 | 29.4 | 54.6 | 93.0 | 140.4 |
| 4.1.1 | 91 | 4 | 5 | 0 | 0 | 485 | 1:35 | 2:10 | 1:2.75 | 0.32 | 3.6 | 6.5 | 10.5 | 9.1 | 13.7 | 25.4 | 43.3 | 65.4 |
| 4.1.2 | 91 | 4 | 5 | 0 | 0 | 485 | 1:35 | 2:10 | 1:1.00 | 0.21 | 4.3 | 7.8 | 12.6 | 10.9 | 19.4 | 36.0 | 61.4 | 92.7 |
| 5.1.1 | 29 | 1 | 25 | 45 | 0 | 460 | 1:40 | 2:20 | 1:1.00 | 0.15 | 6.5 | 12.9 | 18.3 | 25.2 | 46.4 | 98.7 | 146.4 | 180.7 |
| 5.1.2 | 29 | 1 | 25 | 45 | 0 | 460 | 1:40 | 2:20 | 1:1.00 | 0.15 | 6.3 | 11.7 | 16.5 | 20.4 | 42.9 | 91.2 | 134.5 | 175.1 |
| 6.1.1 | 58 | 2 | 40 | 0 | 0 | 950 | 1:30 | 2:10 | 1:1.00 | 0.15 | 6.8 | 12.3 | 14.9 | 18.9 | 45.2 | 83.8 | 111.2 | 148.2 |
| 6.1.2 | 58 | 2 | 40 | 0 | 0 | 950 | 1:30 | 2:10 | 1:3.00 | 0.25 | 4.2 | 7.3 | 9.9 | 11.7 | 27.9 | 51.7 | 68.6 | 91.4 |
| 6.1.3 | 58 | 2 | 40 | 0 | 0 | 950 | 1:30 | 2:10 | 1:5.00 | 0.35 | 3.4 | 5.9 | 8.0 | 9.4 | 23.4 | 43.3 | 57.5 | 76.6 |
| 6.1.4 | 58 | 2 | 40 | 0 | 0 | 950 | 1:30 | 2:10 | 1:7.00 | 0.45 | 2.9 | 5.1 | 6.9 | 8.2 | 18.5 | 34.4 | 45.6 | 60.8 |
| 6.1.5 | 58 | 2 | 40 | 0 | 0 | 950 | 1:30 | 2:10 | 1:10.00 | 0.55 | 2.5 | 4.4 | 6.0 | 7.1 | 10.6 | 19.6 | 26.0 | 34.6 |

TABLE 7

Complex Admixture Based Concrete Proportion and Properties

| Concrete Mixture Proportions, kg/m3 | | | | | Slump, | Compressive Strength, MPa @ | | | | |
|---|---|---|---|---|---|---|---|---|---|---|
| Cement | Admixture | Water | Sand | Coarse Aggregate | W/(C + A) | mm | 1 day | 3 days | 7 days | 28 days | 90 days |
| 520 | 130 | 130 | 420 | 1200 | 0.2 | 200 | 45 | 85 | 120 | 155 | 165 |

What is claimed is:

1. A process for the preparation of a cement composition, said process comprising:
   (a) combining a silicon dioxide containing sorbent with a water reducer or high range water reducer solution to form a mixture;
   (b) processing the mixture formed in step (a) to a dry or partially dry particulate or granular admixture; and
   (c) combining said admixture with a portland cement component, in a ratio of cement component to admixture of about 100:1 to 2:1, to form a cement composition.

2. The process of claim 1 wherein step (c) comprises combining said admixture with said cement component by mixing or grinding.

3. The process of claim 1, wherein said portland cement component is selected from the group consisting of:
   (i) portland cement clinker containing one or more combinations of calcium silicates and/or calcium aluminates and one or more types of calcium sulfate; and
   (ii) portland cement.

4. The process according to claim 2, wherein said cement composition includes mineral components.

5. The process according to claim 4, wherein said mineral components are selected from the group consisting of pozzolans, volcanic glasses, diatomaceous earth, perlite, tuff, pumice, natural sand, quartz, marble, limestone, burnt gaize, burnt clay, burnt shale, rice hull ash, bentonite activated kaolin, granulated blast furnace slag, fly ash, silica fume, catalytic and alum waste, broken glass, broken ceramic, and calcium sulfate.

6. The process according to claim 4, wherein a mass ratio of said mineral components to said admixture is from about 100:1 to about 1:1.

7. The process according to claim 4, wherein step (c) comprises separately grinding said portland cement component and said mineral components and subsequently intergrinding or mixing with said admixture.

8. The process according to claim 7, wherein said intermixing or grinding step is carried out in apparatus selected from the group consisting of conventional mixers, high speed mixers, vibrating mixers or mills, air jet mixers or mills, ball mills, and tube ball mills.

9. A dry mix composition comprising a cement composition made according to the process of claim 2 and dry aggregates.

10. A dry mix composition according to claim 9, wherein a mass ratio of said dry aggregates to said cement composition is from about 10:1 to about 1:2.

11. A process for producing the dry mix composition according to claim 9, comprising mixing said cement composition and said dry aggregates in conventional mixers, high speed mixers, vibrating mixers, or air jet mixers.

12. A concrete or mortar incorporating a cement composition produced according to the process of claim 2.

13. A concrete or mortar incorporating a dry mix composition produced according to the process of claim 11.

14. A concrete or mortar incorporating the dry mix composition according to claim 10.

15. The concrete or mortar of claim 12 further including additional fillers or aggregates selected from the group consisting of materials having chemicals, thermal or abrasion resistance, thermal expansion or electric conductivity properties, fibrous materials, and materials that increase the density of the concrete or mortar.

16. The concrete or mortar of claim 13, further including additional fillers or aggregates selected from the group consisting of materials having chemical, thermal or abrasion resistance, thermal expansion or electric conductivity properties, fibrous materials, and materials that increase the density of the concrete or mortar.

17. The concrete or mortar of claim 14, further including additional filler or aggregates selected from the group consisting of materials having chemical, thermal or abrasion resistance, thermal expansion or electric conductivity properties, fibrous materials, and materials that increase the density of the concrete or mortar.

18. A cement composition prepared according to the process of claim 2, wherein said portland cement component is selected from the group consisting of:
  (i) portland cement clinker comprising one or more combinations of calcium silicates and/or calcium aluminates and one or more types of calcium sulfate; and
  (ii) portland cement.

19. The cement composition according to claim 18, further comprising mineral components.

20. The cement composition according to claim 19, wherein said mineral components are selected from the group consisting of pozzolans, volcanic glasses, diatomaceous earth, perlite, tuff, pumice, natural sand, quartz, marble, limestone, burnt gaize, burnt clay, burnt shale, rice hull ash, bentonite, activated kaolin, granulated blast furnace slag, fly ash, silica fume, catalytic and alum wastes, broken glass, broken ceramic, and calcium sulfate.

21. The cement composition according to claim 19, wherein a mass ratio of said mineral components to said admixture is from about 100:1 to about 1:1.

22. The process of claim 2, wherein said sorbent is a fine alkali reactive non-crystalline silicon dioxide containing material, and wherein said water reducer or high range water reducer is selected from the group consisting of sulphonated melamine, naphthalene formaldehyde, polyacrylate containing admixtures, and mixtures thereof.

23. The process of claim 22, wherein a mass ratio of said sorbent to water reducer or high range water reducer is from about 5:1 to 100:1.

24. The process of claim 22, wherein said silicon dioxide containing materials are selected from the group consisting of fly ash, rice hull ash, zeolite, silica fume, bentonite, activated kaolin, montmorillonite and diatomaceous earth.

25. The process of claim 2, wherein said sorbent includes a water accumulating component selected from the group consisting of porous lightweight sand, volcanic pumice, tuff, expanded clay, expanded perlite, expanded slag, and expanded glass.

26. The process according to claim 25, wherein a mass ratio of said sorbent to said water accumulating component is from about 10:1 to about 1:1.

27. The process according to claim 2, wherein said sorbent includes non-organic or organic salts or hydroxides of metals as an electrolytic agent.

28. The process according to claim 27, wherein said electrolytic agent is selected from the group consisting of metal alkali and alkali earth aluminates, hydroxides and/or carbonates, sodium nitrite, Al, Na, K or Ca sulphate, calcium chloride, and calcium formate.

29. The process according to claim 28, wherein a mass ratio of said sorbent to said electrolytic agent is from about 10:1 to about 1000:1.

30. The process according to claim 2, wherein said sorbent includes hydrates, partially hydrated and dehydrated salts or compounds that combine with water as a water combining component of said sorbent.

31. The process according to claim 30, wherein said water combining component is selected from the group consisting of calcium sulfate, high alumina cement and Na sulphate.

32. The process according to claim 30, wherein a mass ratio of sorbent to water combining component is from about 1:1 to about 100:1.

33. The process according to claim 2, wherein said admixture includes a water-soluble polymer.

34. The process according to claim 33, wherein said water-soluble polymer is selected from the group consisting of polyvinyl alcohol, polyvinyl acetate, polyacrylamide, cellulose ethers, methylcellulose, carboxymethyl celluose, and hydroxyethyl cellulose.

35. The process according to claim 34, wherein a mass ratio of said sorbent to said water soluble polymer is from about 3:1 to about 100:1.

36. The process according to claim 22, wherein said admixture includes a retarder of hydration, setting, and/or hardening of a cement composition.

37. The process according to claim 36, wherein said retarder is selected from the group consisting of lignosulphonates, sugars, hydroxycarbonic acids, and their salts, carboxylates, phosphonic or phosphoric acids, and their ethers and salts.

38. The process according to claim 37, wherein a mass ratio of sorbent to retarder is from about 50:1 to about 1000:1.

39. The process according to claim 2, wherein said admixture includes air detraining, hydrophobic, air entraining, foaming and/or gas creating components as structure formation components.

40. The process according to claim 39, wherein said air detraining component is three-butyl phosphate.

41. The process according to claim 39, wherein said hydrophobic component is selected from the group consisting of silicon-containing compounds containing silicones, silanes, silanols and/or siloxanes groups.

42. The process according to claim 39, wherein said air entraining or said foaming components are selected from the group consisting of neutralised hydroaromatic and fatty carboxylic acid, tall oil, vinsol resin and protein-containing mixtures.

43. The process according to claim 39, wherein said gas creating component is metal powder and/or hydrogen peroxide.

44. The process according to claim 39, wherein a mass ratio of said sorbent to said structure formation components is from about 10:1 to about 10000:1.

45. The process according to claim 2, wherein said admixture includes grinding aid components.

46. The process according to claim 45, wherein said grinding aid components are selected from the group consisting of triethanol amine, amine acetate salts, EDTA, acetic acid, hydrocarbons, silanes, methyl chlorine and fluorine silane.

47. The process according to claim 45, wherein a mass ratio of said sorbent to said grinding aid components is from about 10:1 to about 10000:1.

48. The process according to claim 2, wherein step (a) comprises combining said sorbent and said water reducer or high range water reducer in mixing apparatus selected from the group consisting of conventional mixers, high speed spindle or planetary mixers, vibrating mixers or mills, and air jet mixers or mills.

49. The process according to claim 2, further comprising at least one of granulating, drying, pressing, extrusion, crushing, and calendering of said admixture.

50. A cement composition prepared according to the process of claim 2 and comprising a dry or partially dry granular admixture of a silicon dioxide containing sorbent and a water reducer or high range water reducer, and said admixture combined with a portland cement component.

51. The composition of claim 50, wherein said sorbent is a fine alkali reactive non-crystalline silicon dioxide containing material, and said water reducer or high range water reducer is selected from the group consisting of sulphonated melamine, naphthalene formaldehyde, polyacrylate containing admixtures, and mixtures thereof.

52. The composition of claim 51, wherein a mass ratio of said sorbent to water reducer or high range water reducer is from about 5:1 to about 100:1.

53. The composition according to claim 51, wherein said silicon dioxide containing material is selected from the group consisting of fly ash, rice hull ash, zeolite, silica fume, bentonite, activated kaolin, montmorillonite and diatomaceous earth.

54. The composition according to claim 50, wherein said sorbent includes porous lightweight sand, volcanic pumice, tuff, expanded clay, expanded perlite, expanded slag, and/or expanded glass as a water accumulating component.

55. The composition according to claim 54, wherein a mass ratio of said sorbent to said water accumulating component is from about 10:1 to about 1:1.

56. The composition according to claim 50, wherein said sorbent includes non-organic or organic salts or hydroxides of metals as an electrolytic agent.

57. The composition according to claim 56, wherein said electrolytic agent is selected from the group consisting of metal alkali and alkali earth aluminates, hydroxides and/or carbonates, sodium nitrite, Al, Na, K or Ca sulphate, calcium chloride, and calcium formate.

58. The composition according to claim 57, wherein a mass ratio of said sorbent to said electrolytic agent is from about 10:1 to about 1000:1.

59. The composition according to claim 50, wherein said sorbent includes hydrated, partially hydrated and dehydrated salts or combinations thereof that combine with water as a water combining component of said sorbent.

60. The composition according to claim 59, wherein said water combining component is selected from the group consisting of calcium sulfate, high alumina cement and Na sulphate.

61. The composition according to claim 59, wherein a mass ratio of sorbent to water combining component is from about 1:1 to about 100:1.

62. The composition according to claim 50, wherein said admixture further comprises a water-soluble polymer.

63. The composition according to claim 62, wherein said water-soluble polymer is selected from the group consisting of polyvinyl alcohol, polyvinyl acetate, polyacrylamide, cellulose ethers, methylcellulose, carboxymethyl cellulose, and hydroxyethyl cellulose.

64. The composition according to claim 62, wherein a mass ratio of said sorbent to said water soluble polymer is from about 3:1 to about 100:1.

65. The composition according to claim 50, wherein said admixture further comprises a retarder of hydration, setting, and/or hardening of a cement composition.

66. The composition according to claim 65, wherein said retarder is selected from the group consisting of lignosulphonates, sugars, hydroxycarbonic acids and their salts, carboxylates, phosphonic or phosphoric acids, and their ethers and salts.

67. The composition according to claim 65, wherein a mass ratio of sorbent to retarder is from about 50:1 to about 1000:1.

68. The composition according to claim 50, wherein said admixture further comprises air detraining, hydrophobic, air entraining, foaming and/or gas creating components as structure formation components.

69. The composition according to claim 68, wherein said air detraining component is three-butyl phosphate.

70. The composition according to claim 68, wherein said hydrophobic component is selected from the group consisting of silicon-containing compounds containing silicones, silanes, silanols and/or siloxanes groups.

71. The composition according to claim 68, wherein said air entraining or said foaming components are selected from the group consisting of neutralized hydroaromatic and fatty carboxylic acid, tall oil, vinsol resin and protein-containing mixtures.

72. The composition according to claim 68, wherein said gas creating component is metal powder and/or hydrogen peroxide.

73. The composition according to claim 68, wherein a mass ratio of said sorbent to said structure formation components is from about 10:1 to about 10000:1.

74. The composition according to claim 50, further comprising grinding aid components.

75. The composition according to claim 71, wherein said grinding aid components are selected from the group consisting of triethanol amine, amine acetate salts, EDTA, acetic acid, hydrocarbons, silanes, methyl chlorine and fluorine silane.

76. The composition according to claim 74, wherein a mass ratio of said sorbent to said grinding aid components is from about 10:1 to about 10000:1.

77. The process of claim 38 wherein said portland cement comprises at least one of moderate heat of hardening cements, high early strength cements, low heat cements, sulfate resisting cements, white portland cements, blended hydraulic cements, portland blast furnace slag cements, portland-pozzolan cements, expanding cements, high alumina cements and oil-well cements.

78. The cement composition of claim 18 wherein said portland cement comprises at least one of moderate heat of hardening cements, high early strength cements, low heat cements, sulfate resisting cements, white portland cements, blended hydraulic cements, portland blast furnace slag cements, portland-pozzolan cements, expanding cements, high alumina cements and oil-well cements.

* * * * *